US010358063B2

(12) United States Patent
Rekow et al.

(10) Patent No.: US 10,358,063 B2
(45) Date of Patent: Jul. 23, 2019

(54) INDUSTRIAL VEHICLE ARMREST

(71) Applicant: Crown Equipment Corporation, New Bremen, OH (US)

(72) Inventors: Craig J. Rekow, Troy, OH (US); Paul D. Magee, Troy, OH (US); Michael P. Gallagher, Greenville, OH (US)

(73) Assignee: Crown Equipment Corporation, New Bremen, OH (US)

( * ) Notice: Subject to any disclaimer, the term of this patent is extended or adjusted under 35 U.S.C. 154(b) by 13 days.

(21) Appl. No.: 15/869,643

(22) Filed: Jan. 12, 2018

(65) Prior Publication Data
US 2018/0201165 A1 Jul. 19, 2018

Related U.S. Application Data

(60) Provisional application No. 62/445,789, filed on Jan. 13, 2017.

(51) Int. Cl.
*B60N 2/75* (2018.01)
*B60N 2/56* (2006.01)
(Continued)

(52) U.S. Cl.
CPC ....... *B60N 2/5664* (2013.01); *B60H 1/00285* (2013.01); *B60N 2/5642* (2013.01); *B60N 2/763* (2018.02); *B60N 2/79* (2018.02); *B60N 2/797* (2018.02); *G05G 1/62* (2013.01); *B60Y 2200/15* (2013.01)

(58) Field of Classification Search
CPC ...... B60N 2/5664; B60N 2/797; B60N 2/763; B60N 2/79; B60N 2/5642; B60H 1/00285; G05G 1/62; B60Y 2200/15
See application file for complete search history.

(56) References Cited

U.S. PATENT DOCUMENTS 3,502,370 A 3/1970 Pommellet
6,347,771 B1 2/2002 Lauzon et al.
(Continued)

FOREIGN PATENT DOCUMENTS

CN 102960971 A 3/2012
CN 102704522 A 10/2012
(Continued)

OTHER PUBLICATIONS

Aurelien Petiaud; International Search Report and Written Opinion; International Application No. PCT/US2018/013485; dated Apr. 5, 2018; European Patent Office; Rijswijk, Netherlands.

*Primary Examiner* — Philip F Gabler
(74) *Attorney, Agent, or Firm* — Stevens & Showalter LLP

(57) ABSTRACT

An armrest includes an upper support section having one or more ventilation and drainage apertures that couple an upper surface of the upper support section to a lower portion of the armrest to facilitate airflow and drainage between the upper surface of the upper support section and the lower portion of the armrest. The armrest also includes one or more control implements and an arm pad removably coupled to the upper support section. The arm pad includes one or more pad apertures formed therein that communicate with the ventilation and drainage apertures to allow ventilation and drainage between an upper surface of the arm pad and the lower portion of the armrest.

21 Claims, 12 Drawing Sheets

(51) Int. Cl.
*G05G 1/62* (2008.04)
*B60H 1/00* (2006.01)

(56) References Cited

U.S. PATENT DOCUMENTS

| | | | |
|---|---|---|---|
| 6,802,566 B2 | 10/2004 | Prince et al. | |
| 6,871,721 B2 | 3/2005 | Smiley et al. | |
| 7,018,158 B2 | 3/2006 | Amamiya et al. | |
| 7,077,468 B2 | 7/2006 | Maierholzner | |
| 7,121,608 B2* | 10/2006 | Billger | B60N 2/002 |
| | | | 296/65.06 |
| 7,614,703 B2* | 11/2009 | Bergin | A47C 7/68 |
| | | | 297/188.14 |
| 7,625,625 B2 | 12/2009 | Rios et al. | |
| 7,775,584 B2 | 8/2010 | Hughes, Jr. et al. | |
| 7,828,388 B2 | 11/2010 | Thomas | |
| 8,403,416 B2 | 3/2013 | Muck et al. | |
| 8,414,082 B2 | 4/2013 | Nakamura et al. | |
| 8,608,220 B2 | 12/2013 | Donovan et al. | |
| 8,777,320 B2 | 7/2014 | Stoll et al. | |
| 8,944,499 B2 | 2/2015 | Oh et al. | |
| 8,944,500 B2 | 2/2015 | Oh et al. | |
| 9,016,777 B2 | 4/2015 | Oh et al. | |
| 9,415,712 B2 | 8/2016 | Stoll et al. | |
| 9,527,458 B2 | 12/2016 | Sperl et al. | |
| 9,981,575 B2* | 5/2018 | Hamdoon | B60N 2/4235 |
| 2004/0074244 A1 | 4/2004 | Ichishi et al. | |
| 2006/0061122 A1 | 3/2006 | Billger et al. | |
| 2009/0058120 A1 | 3/2009 | Ioka et al. | |
| 2009/0146480 A1 | 6/2009 | Knowlden | |
| 2009/0162596 A1 | 6/2009 | Rios et al. | |
| 2010/0183814 A1 | 7/2010 | Rios et al. | |
| 2012/0096886 A1 | 4/2012 | Palmer | |
| 2012/0146381 A1* | 6/2012 | Spooner | A47C 7/546 |
| | | | 297/411.46 |
| 2012/0187726 A1 | 7/2012 | Uwague-Igharo | |
| 2013/0113251 A1 | 5/2013 | First | |
| 2013/0299128 A1 | 11/2013 | Bergamini | |
| 2015/0362229 A1 | 12/2015 | Oh et al. | |
| 2016/0221808 A1 | 8/2016 | Babel et al. | |
| 2017/0217284 A1 | 8/2017 | Ji et al. | |
| 2017/0232872 A1 | 8/2017 | Faruque et al. | |

FOREIGN PATENT DOCUMENTS

| | | |
|---|---|---|
| DE | 3722814 A1 | 1/1989 |
| DE | 10225292 A1 | 12/2003 |
| DE | 10349410 A1 | 5/2004 |
| DE | 202005003158 U1 | 6/2005 |
| EP | 1588892 A2 | 10/2005 |
| EP | 1705053 A2 | 9/2006 |
| EP | 1748026 A1 | 1/2007 |
| EP | 1878611 A1 | 1/2008 |
| EP | 2517928 A2 | 10/2012 |
| JP | 060213519 A | 10/1985 |
| JP | 03057415 A | 3/1991 |
| JP | 1996286782 A | 11/1996 |
| JP | 2000185674 A | 7/2000 |
| JP | 03305685 B2 | 7/2002 |
| JP | 03460190 B2 | 10/2003 |
| JP | 2004203336 A | 7/2004 |
| JP | 2004352160 A | 12/2004 |
| JP | 2005255000 A | 9/2005 |
| JP | 2006076503 A | 3/2006 |
| JP | 2006102131 A | 4/2006 |
| JP | 2006218902 A | 8/2006 |
| JP | 2013119344 A | 8/2006 |
| JP | 2014141131 A | 8/2014 |
| KR | 0174223 A | 11/1998 |
| KR | 2006031402 | 4/2006 |
| KR | 10-0993999 | 11/2010 |
| KR | 20-0479799 | 3/2016 |

* cited by examiner

INDUSTRIAL VEHICLE ARMREST

CROSS REFERENCE TO RELATED APPLICATION

This application claims the benefit of U.S. Provisional Patent Application Ser. No. 62/445,789, filed Jan. 13, 2017, entitled "INDUSTRIAL VEHICLE ARMREST," the entire disclosure of which is hereby incorporated by reference herein.

BACKGROUND OF THE INVENTION

The present invention relates to an armrest for an industrial vehicle, and an industrial vehicle having an armrest.

SUMMARY OF THE INVENTION

In accordance with a first aspect of the present invention, an armrest comprises an upper support section having one or more ventilation and drainage apertures that couple an upper surface of the upper support section to a lower portion of the armrest to facilitate airflow and drainage between the upper surface of the upper support section and the lower portion of the armrest. The armrest further comprises one or more control implements and an arm pad removably coupled to the upper support section, the arm pad comprising one or more pad apertures formed therein that communicate with the ventilation and drainage apertures to allow ventilation and drainage between an upper surface of the arm pad and the lower portion of the armrest.

The upper support section may further comprise one or more drainage channels, the one or more drainage channels being substantially parallel to each other and aligned with the one or more pad apertures to atmospherically couple areas above and below the upper surface of the arm pad, and one or more vent apertures that are atmospherically coupled to one or more of the one or more pad apertures.

The arm pad may further comprise one or more vent apertures extending between the upper surface and a lower surface of the arm pad, and one or more drainage channels, each drainage channel positioned about parallel to each other on the lower surface of the arm pad.

Each drainage channel may be substantially parallel with an armrest axis, and each vent aperture may be substantially orthogonal to an armrest axis.

The armrest may further comprise a handle coupled to the upper support section, wherein the one or more control implements comprise armrest control implements coupled to the upper support section that selectably release or restrain the armrest between ergonomic positions.

In accordance with a second aspect of the present invention, an armrest comprises an upper support section, one or more control implements, and an arm pad removably coupled to the upper support section, the arm pad comprising an upper surface with one or more pad apertures formed therein that atmospherically couple areas above and below the upper surface of the arm pad. At least one of the upper support section or the arm pad comprises one or more drainage channels, the one or more drainage channels being substantially parallel to each other and aligned with the one or more pad apertures to atmospherically couple areas above and below the upper surface of the arm pad.

Each drainage channel may be substantially parallel with an armrest axis, and each pad aperture may be substantially orthogonal to the armrest axis.

The upper support section may further comprise one or more vent apertures that are atmospherically coupled to one or more of the one or more pad apertures.

The armrest may further comprise a handle coupled to the upper support section, wherein the one or more control implements comprise armrest control implements coupled to the upper support section that selectably release or restrain the armrest between ergonomic positions.

In accordance with a third aspect of the present invention, an industrial vehicle comprises an operator chair including an armrest, the armrest comprising an upper support section having one or more ventilation and drainage apertures that couple an upper surface of the upper support section to a lower portion of the armrest to facilitate airflow and drainage between the upper surface of the upper support section and the lower portion of the armrest. The armrest further comprises one or more control implements and an arm pad removably coupled to the upper support section, the arm pad comprising one or more pad apertures formed therein that communicate with the ventilation and drainage apertures to allow ventilation and drainage between an upper surface of the arm pad and the lower portion of the armrest.

The one or more control implements may comprise vehicle control implements in the form of one or more joysticks arranged on or about an orthogonal axis to an armrest axis.

The one or more control implements may comprise vehicle control implements in the form of a plurality of mini-levers arranged on or about a shallow arc centered off the armrest.

The one or more control implements may comprise vehicle control implements in the form of a plurality of fingertip control levers having at least two degrees of freedom to actuate a vehicle function.

The upper support section may further comprise one or more drainage channels, the one or more drainage channels being substantially parallel to each other and aligned with the one or more pad apertures to atmospherically couple areas above and below the upper surface of the arm pad.

The arm pad may further comprise one or more vent apertures extending between upper and lower surfaces of the arm pad, and one or more drainage channels, each drainage channel positioned about parallel to each other on the lower surface of the arm pad.

Each drainage channel may be substantially parallel with an armrest axis, and each vent aperture may be substantially orthogonal to the armrest axis.

The armrest may further comprise a handle coupled to the upper support section, wherein the one or more control implements comprise armrest control implements coupled to the upper support section that selectably release or restrain the armrest between ergonomic positions.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

Industrial vehicle armrests may become saturated with an unclean mixture of dirt, grease, rain water, sweat, and body oil that is hard to clean and renders operator contact with the armrest unpleasant. By allowing ventilation and drainage of the upper surface of the armrest, the overall cleanliness of the armrest is improved by reducing the accumulation of the unclean mixture thereby increasing operator comfort and productivity. Further, it is contemplated that a removable arm pad will further the goals of operator comfort and productivity by allowing the upper surface of the armrest to be replaced when the unclean mixture becomes difficult or impossible to remove. The addition of armrest position markers and maintenance alignment markings further increase productivity of the operator by increasing the speed at which an armrest is positioned for operator use and comfort in regards to the position markers and quickly positioning the armrest for service of the industrial vehicle in regards to the maintenance markers.

Figure 1:
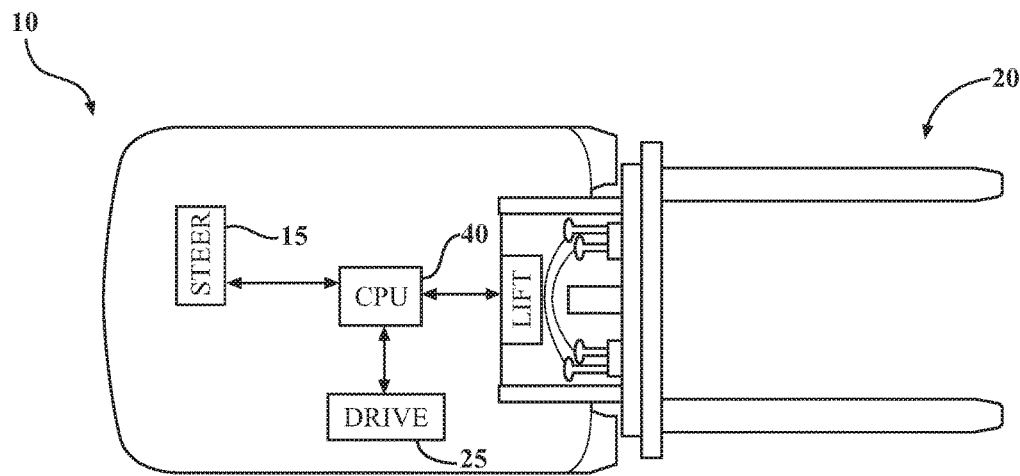
FIG. 1 depicts a top view of an industrial vehicle according to one or more embodiments shown and described herein.

FIG. 1 illustrates an industrial vehicle 10 in the form of a lift truck comprising conventional industrial vehicle hardware, such as a steering mechanism 15, storage and retrieval hardware 20, and a vehicle drive mechanism 25, the details of which are beyond the scope of the present disclosure and may be gleaned from conventional and yet to be developed teachings in the industrial vehicle literature—examples of which include U.S. Pat. Nos. 6,135,694, RE37215, 7,017,689, 7,681,963, 8,131,422, and 8,718,860, each of which is assigned to Crown Equipment Corporation. It should be understood that although several embodiments of the industrial vehicle 10 are shown and described, any type of forklift, tractor (A.K.A. "tugger"), or automated guided vehicle is contemplated; to include those powered industrial trucks identified by the United States Department of Labor, Occupational Safety & Health Administration (OSHA) in Class I—Electric Motor Rider Trucks, Class II—Electric Motor Narrow Aisle Trucks, Class III—Electric Motor Hand Trucks or Hand/Rider Trucks, Class IV—Internal Combustion Engine Trucks (Solid/Cushion Tires), Class V—Internal Combustion Engine Trucks (Pneumatic Tires), Class VI—Electric and Internal Combustion Engine Tractors, and Class VII—Rough Terrain Forklift Trucks. A vehicle controller 40 controls operational functions of the industrial vehicle 10 such as the functions of the storage and retrieval hardware 20, vehicle drive mechanism 25, and/or the steering mechanism 15.

Figure 2:
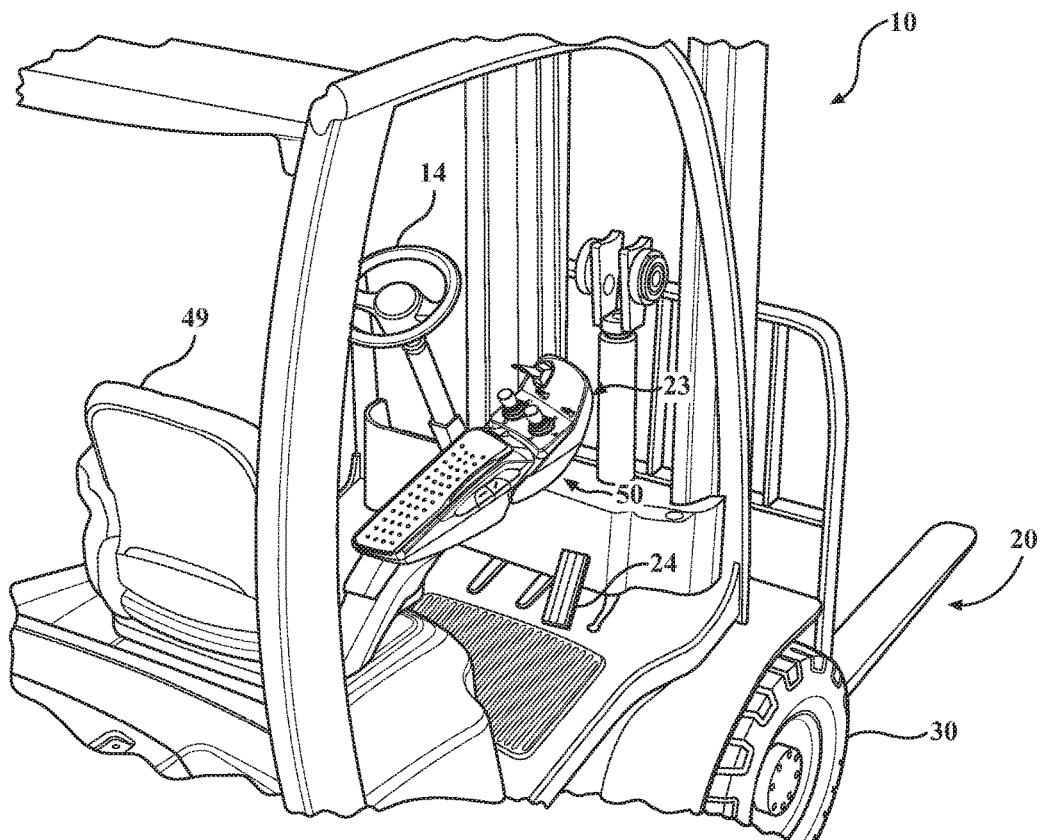
FIG. 2 depicts a perspective view of the industrial vehicle according to one or more embodiments shown and described herein.

Referring to FIG. 2, the industrial vehicle 10 may comprise one or more user interfaces. For example, and not by way of limitation, the user interfaces may comprise a storage and retrieval hardware control device 23, a vehicle speed control device 24, a steering control device 14, or combinations thereof. It should be understood by those skilled in the art that the storage and retrieval hardware control device 23 may be a lever, knob, joystick, touch screen hardware control interface, or the like and configured to control the storage and retrieval hardware 20. Further discussion of the storage and retrieval hardware control device 23 is hereafter in regards to FIGS. 12-15. The storage and retrieval hardware 20 may include, but is not limited to, a set of fork tines, a container handler, a turret with forks, a pantrograph, a telescopic handler, and the like. The vehicle speed control device 24 may be a lever, a pedal, touch screen hardware control interface, or the like and used to control the vehicle drive mechanism 25. The steering control device 14 may be a wheel, a knob, a lever, or the like and used to control the steering mechanism 15 which is coupled to one or more wheels 30.

FIG. 2 illustrates one location embodiment of the storage and retrieval hardware control device 23 as coupled to an armrest 50. In one location embodiment, the armrest 50 is coupled to an operator chair 49. It is also contemplated, in one location embodiment, the armrest 50 is coupled to the industrial vehicle 10 for situations where the operator is required to stand or partially stand/lean to operate the industrial vehicle 10.

Figure 3:
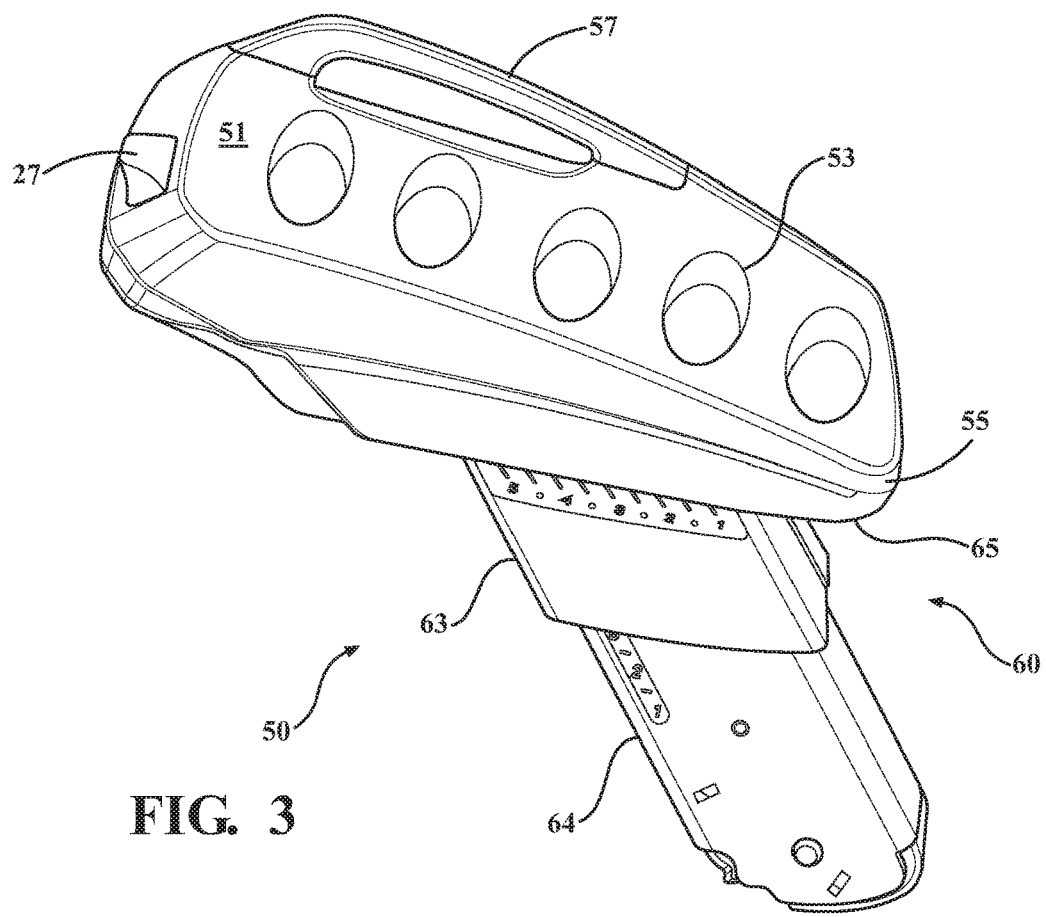
FIG. 3 depicts a perspective view of an armrest according to one or more embodiments shown and described herein.

FIG. 3 illustrates one embodiment of the armrest 50. The armrest 50 comprises an upper support section 55, a base section 60, and one or more ventilation and drainage apertures 53. The upper support section 55 may comprise at least one of a handle 57 and one or more operator input devices 27 (e.g., horn). The base section 60 may comprise an upper mount 63 and a lower mount 64. It is contemplated that the one or more ventilation and drainage apertures 53 atmospherically couple the atmosphere above an upper surface 51 of the armrest 50 to a lower portion of the armrest 50. Specifically, the one or more ventilation and drainage apertures 53 couple the atmosphere above the armrest 50 to the atmosphere below the upper surface 51 which is defined as the lower portion of the armrest 50. In other words, the lower portion of the armrest 50 is any part of the armrest 50 below the upper surface 51. The one or more ventilation and drainage apertures 53 serve to provide drainage of any object whether a solid, liquid, or gas, from above the upper surface 51 to lower portion of the armrest 50 and provide ventilation from the lower portion of the armrest 50 to above the upper surface 51. In other words, it is contemplated that the upper surface 51 defines a plane, either flat, curved, or some combination there between which separates the armrest 50 into an area above the upper surface 51, or where an operator rests their arm, and an area below the upper surface 51. It is an atmospheric coupling of these two areas in which the ventilation and drainage apertures 53 and any associated apertures, channels, or other structure coupled to them is designed to allow, for example, water, sweat, etc., to cross the upper surface 51 from above to below and to, for example, allow air to move from below to above the upper surface 51. As explained in greater detail hereinafter, the one or more ventilation and drainage apertures 53 may take on many sizes and shapes to accomplish its function of drainage and ventilation through the upper surface 51 of the armrest 50. For example, and not by way of limitation, it is contemplated that the one or more ventilation and drainage apertures 53 may be one large aperture that encompasses much of the upper surface 51, many smaller apertures sized such as pinholes, or any size or combination in between.

Figure 4:
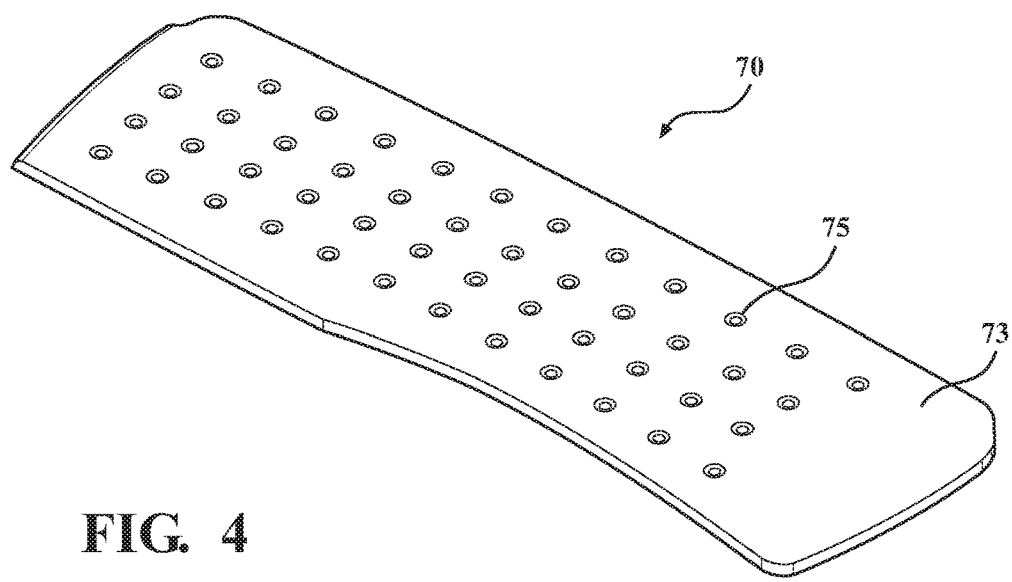
FIG. 4 depicts a perspective view of an arm pad according to one or more embodiments shown and described herein.

Referring now to FIG. 4, an arm pad 70 may be used in conjunction with the armrest 50 shown in FIG. 3. The arm pad 70 comprises a resilient material 73 and one or more pad apertures 75. The resilient material 73 may be, but not limited to, rubber, foam, plastic, wood, cloth and the like. In one embodiment, the resilient material 73 is a hydrophobic material that is resistant to oils, detergents, chemicals, and solvents. In one embodiment, the one or more pad apertures 75 may align with the one or more ventilation and drainage apertures 53 shown in FIG. 3 to allow ventilation and drainage between the upper surface 51 and below the upper surface 51. Therefore, the arm pad 70 may rest on the upper surface 51 and provide the necessary apertures to allow drainage and ventilation through the upper surface 51.

Figure 5:
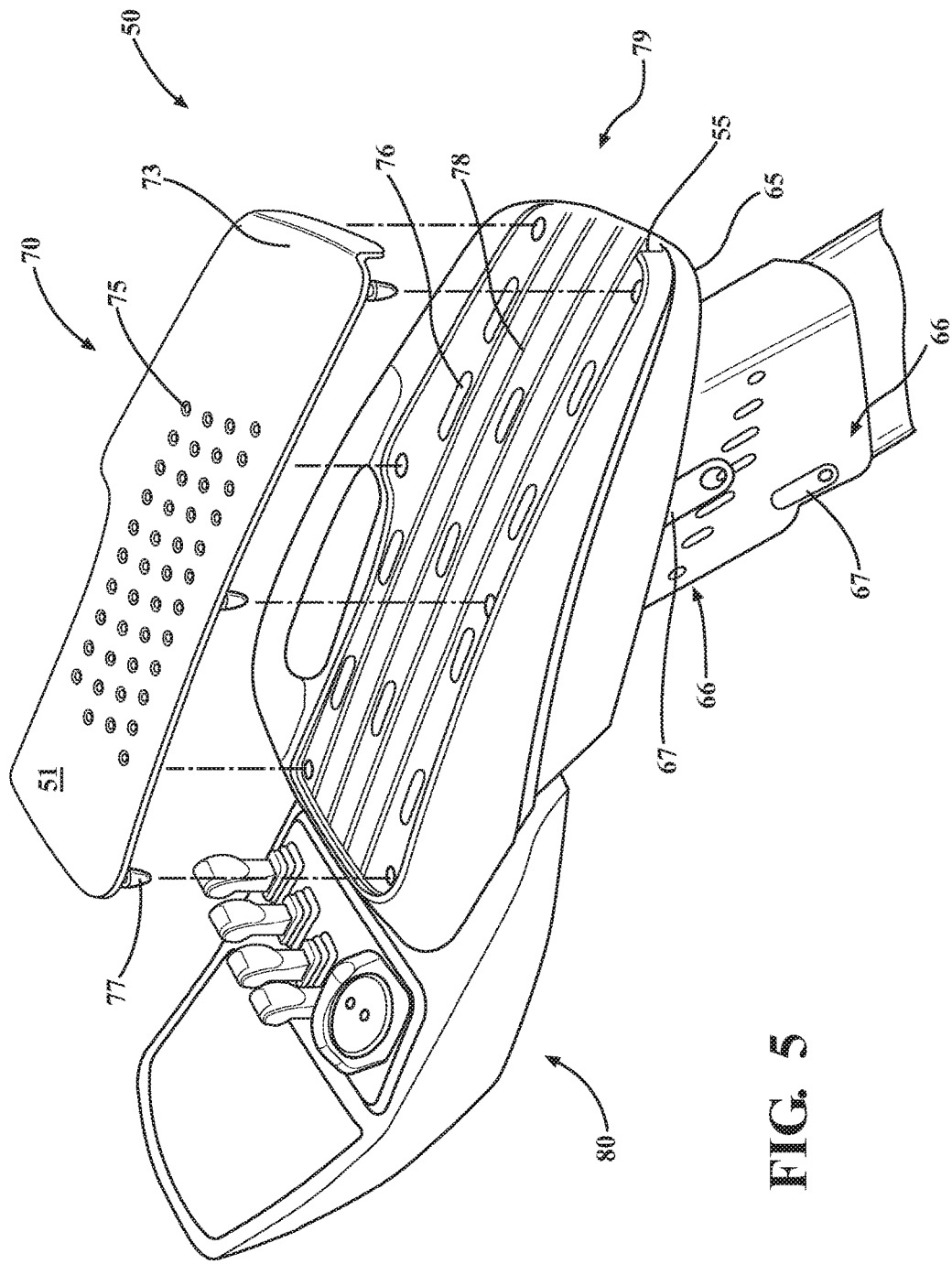
FIG. 5 depicts a perspective view of the armrest according to one or more embodiments shown and described herein.

Referring now to FIG. 5, one embodiment of the armrest 50 is shown. In this embodiment, the armrest 50 comprises the arm pad 70, the lower support section 65, and a control pod 80. The control pod 80, one or more position markers 66, and one or more sight windows 67 are discussed in greater detail herein below after the discussion of the ventilation and drainage features of the armrest 50. Still referring to FIG. 5, the arm pad 50 comprises one or more attachment mechanisms 77 in addition to the one or more pad apertures 75 and resilient material 73. It is contemplated that the one or more attachment mechanisms 77 may be push through fasteners as shown in FIG. 5 or they may be snap buttons, hook and loop fasteners, reclosable fasteners such as 3M™ Dual Lock™ Reclosable Fasteners, tape, adhesive, glue, cement, screws, nails, bolts and nuts, and the like fasteners used to removably couple two items together.

In the embodiment shown in FIG. 5, the upper surface 51 is defined by the upper surface of the arm pad 70. The upper support section 55 may comprise one or more channels 78. The one or more pad apertures 75 may align with the one or more channels 78 to atmospherically couple the area above and below the upper surface 51. For example, and not by way of limitation, water or sweat that accumulates on the upper surface 51 may drain away from the upper surface through the one or more pad apertures 75, along the one or more channels 78, and drain from the rear portion 79 of the armrest 50. This embodiment illustrates only drainage of the upper surface 51. In one embodiment, it may be advantageous to ventilate the upper surface 51 as well. The upper support section 55 may comprise one or more vent apertures 76 to allow airflow from below the upper surface 51. In this embodiment, the one or more pad apertures 75 are atmospherically coupled to the one or more vent apertures 76 such that only the one or more vent apertures 76 are present. In yet another embodiment, both the one or more vent apertures 76 and the one or more channels 78 are present. In other words, it is contemplated that the size, position, inclusion, exclusion, and arrangement of at least one of the one or more pad apertures 75, one or more channels 78, and the one or more vent apertures 76 may be changed or modified to accommodate different forms of the armrest 50.

Figure 6:
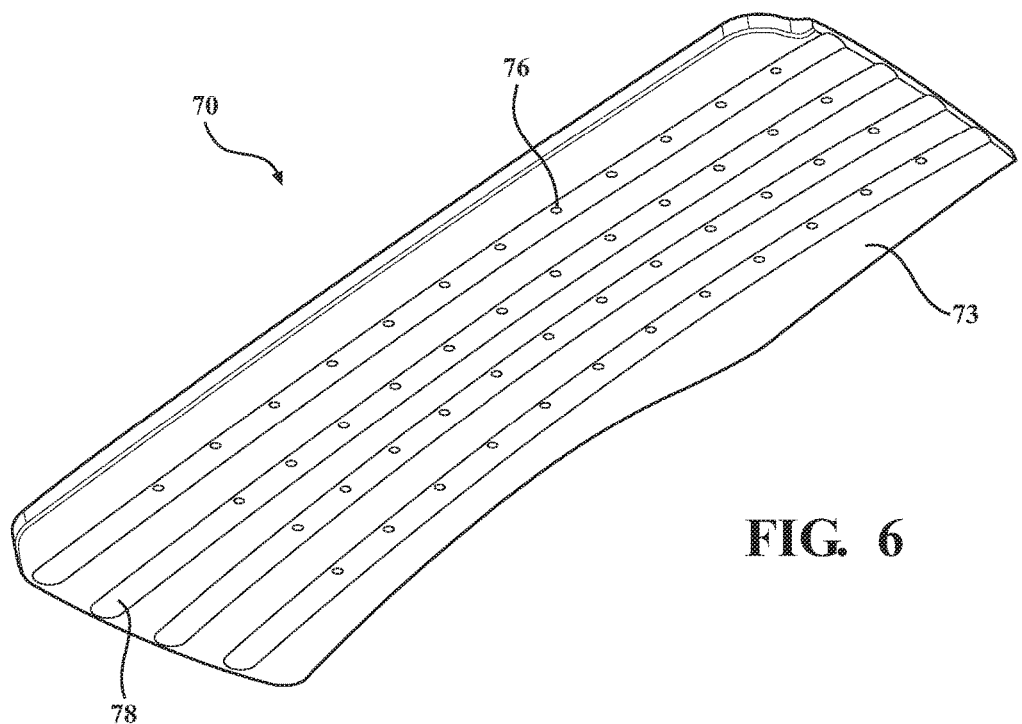
FIG. 6 depicts a perspective view of the arm pad according to one or more embodiments shown and described herein.
Figure 7:
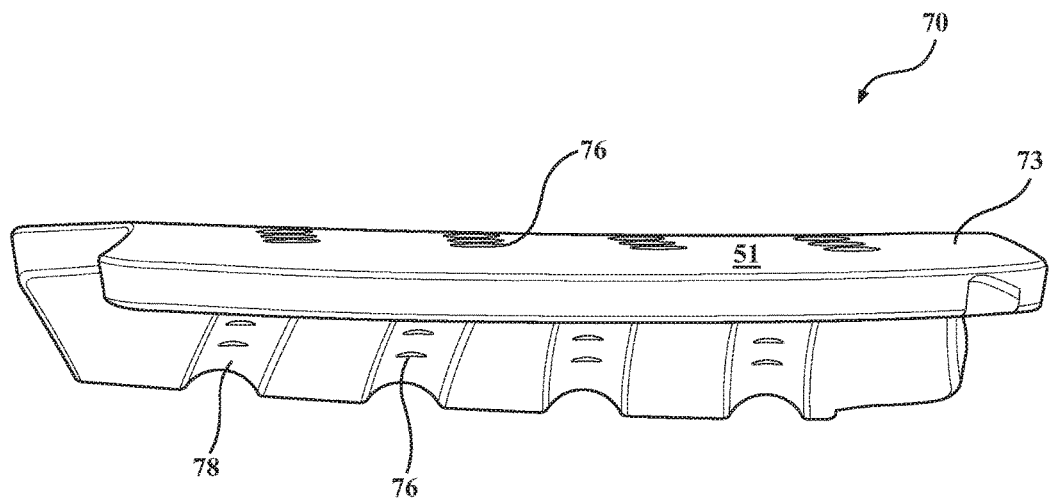
FIG. 7 depicts a front view of the arm pad according to one or more embodiments shown and described herein.
Figure 8:
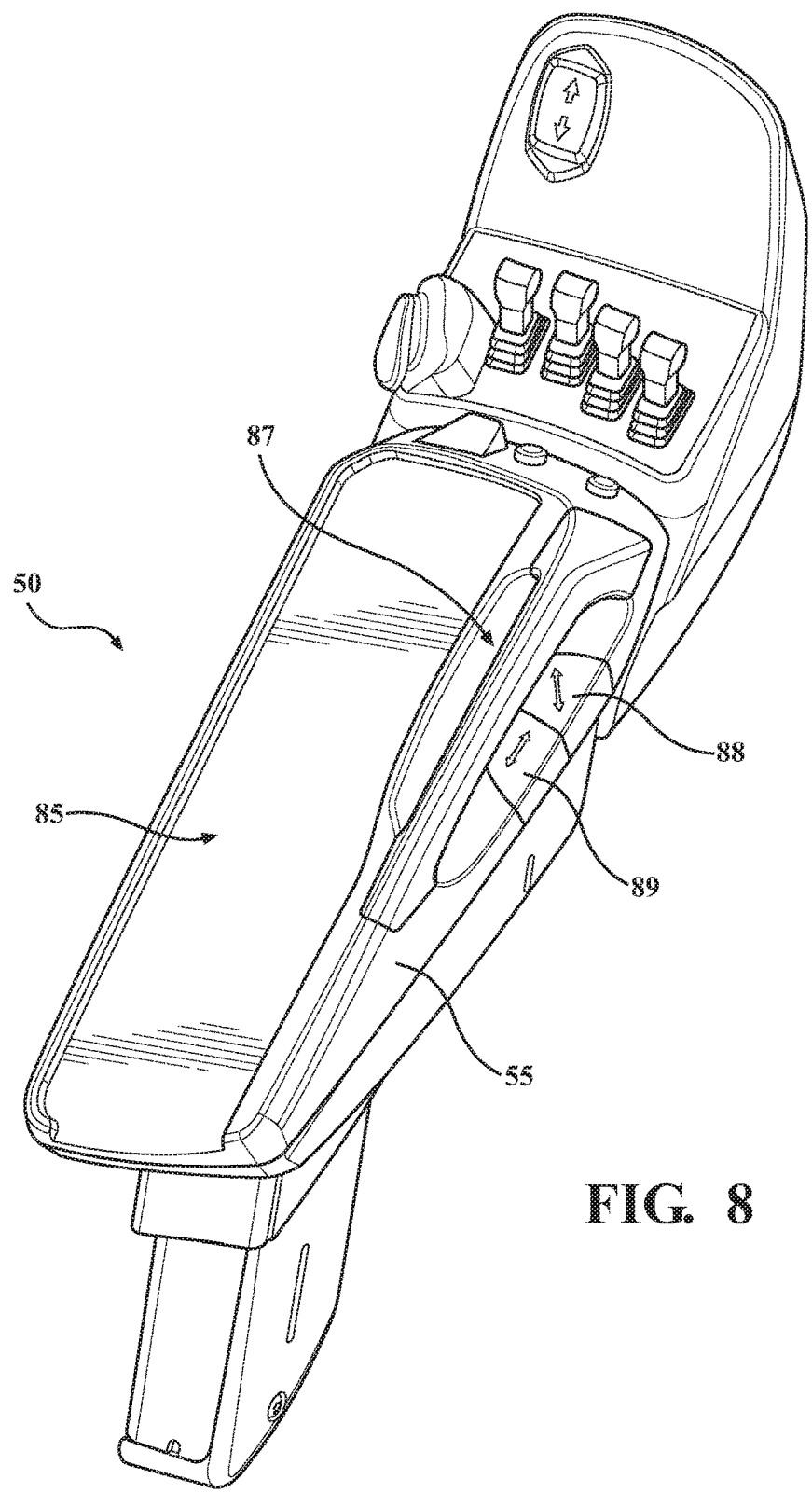
FIG. 8 depicts a perspective view of the armrest according to one or more embodiments shown and described herein.
Figure 9:
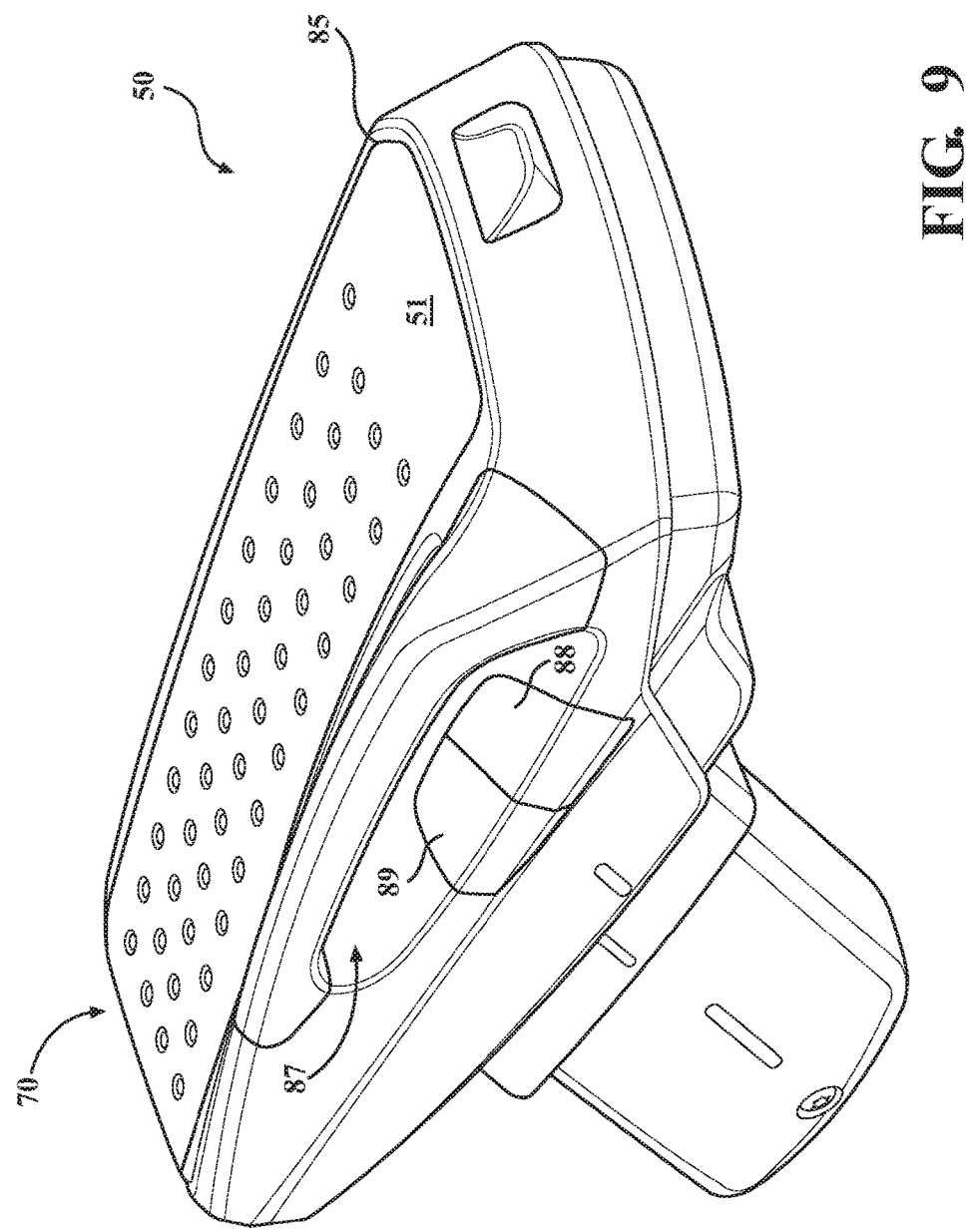
FIG. 9 depicts a perspective view of the armrest according to one or more embodiments shown and described herein.

FIGS. 6 and 7 illustrate another embodiment of the arm pad 70. In this embodiment, the arm pad 70 comprises one or more vent apertures 76, resilient material 73, and one or more channels 78. In this embodiment, the arm pad 70 defines the upper surface 51. Referring to FIG. 8, the arm pad 70 of FIGS. 6 and 7 resides in a recess 85 in the upper support section 55 of the arm rest 50. FIG. 9 illustrates the arm pad 70 placed within the recess 85 of the armrest 50. It is contemplated that the arm pad 70 is removably coupled to the recess 85 as described herein before.

Figure 10:
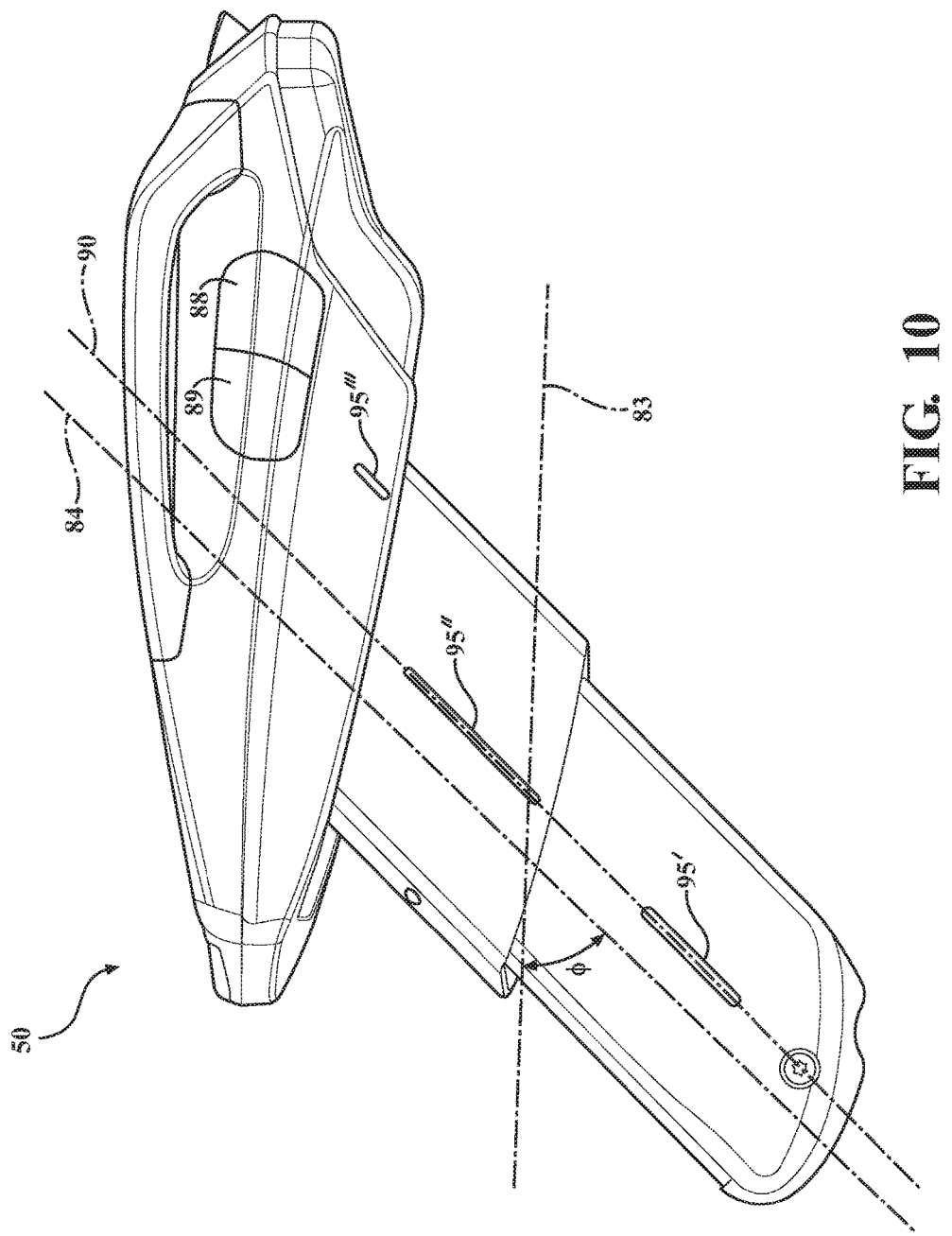
FIG. 10 depicts a left side view of the armrest according to one or more embodiments shown and described herein.

In one embodiment, the armrest 50 may comprise one or more control implements to position the armrest 50 for use by an operator. Referring now to FIGS. 8 and 9, a first armrest control implement 88 and a second armrest control implement 89 selectably release the armrest 50 from a restrained position to allow an operator to reposition the armrest 50 for use. It is contemplated that one of the two armrest control implements selectably releases the armrest 50 from the restrained position along a fore/aft axis 83 (FIG. 10) and the other control implement selectably releases the armrest 50 from the restrained position along a raised/lowered axis 84 (FIG. 10). The fore/aft axis 83 is offset from the raised/lowered axis 84 by angle Ø. It is contemplated that the angle Ø may be modified to suit the specific industrial vehicle 10 (FIG. 2) that the armrest 50 is coupled to and to account for a seated versus standing/leaning position of the operator operating the industrial vehicle 10. It should be noted that although it appears the raised/lowered axis 84 is about parallel with a maintenance axis 90, this disclosure is not limited to about parallel. The maintenance axis 90 is discussed further hereinafter in relation to FIG. 10.

Still referring to FIGS. 8 and 9, the armrest 50 comprises a handle aperture 87 to accommodate an operator who will place their hand in the handle aperture 87 to actuate at least one of the first armrest control implement 88 and the second armrest control implement 89 and grasp the armrest 50 to reposition using only one hand.

Referring now to FIG. 10, in one embodiment, the armrest 50 may comprise maintenance alignment markings, exemplarily illustrated as three markings 95', 95", and 95'". It is contemplated that the armrest 50 may have a maintenance position along the fore/aft axis 83 and the raised/lowered axis 84 in which the armrest 50 is ideally positioned to allow the armrest 50 to be moved out of the way to allow access to a battery, engine, or other items requiring maintenance. For example, and not by way of limitation, the armrest 50 may be positioned in the maintenance position such that any structure the armrest 50 is coupled to can be moved, along with the armrest 50 such that the armrest 50 will avoid contact with, or receiving damage from, other parts of the industrial vehicle 50 (FIG. 2). At least one of the first armrest control implement 88 and the second armrest control implement 89 are actuated to release the armrest 50 from the restrained position such that an operator can align the maintenance alignment markings 95', 95", 95'" along a maintenance axis 90. For example, and not by way of limitation, in FIG. 10, the armrest 50 should be moved along the fore/aft axis 83 such that marking 95'" resides along the maintenance axis 90 and moved along the raised/lowered axis 84 such that marking 95" resides over marking 95'. The position and alignment of the maintenance axis 90 may differ depending on the industrial vehicle 10 the armrest 50 is coupled to. It should be understood that the one or more maintenance alignment markings 95', 95", 95'" may be located anywhere on the armrest 50 and are not limited to the locations shown in the drawings.

Figure 11:
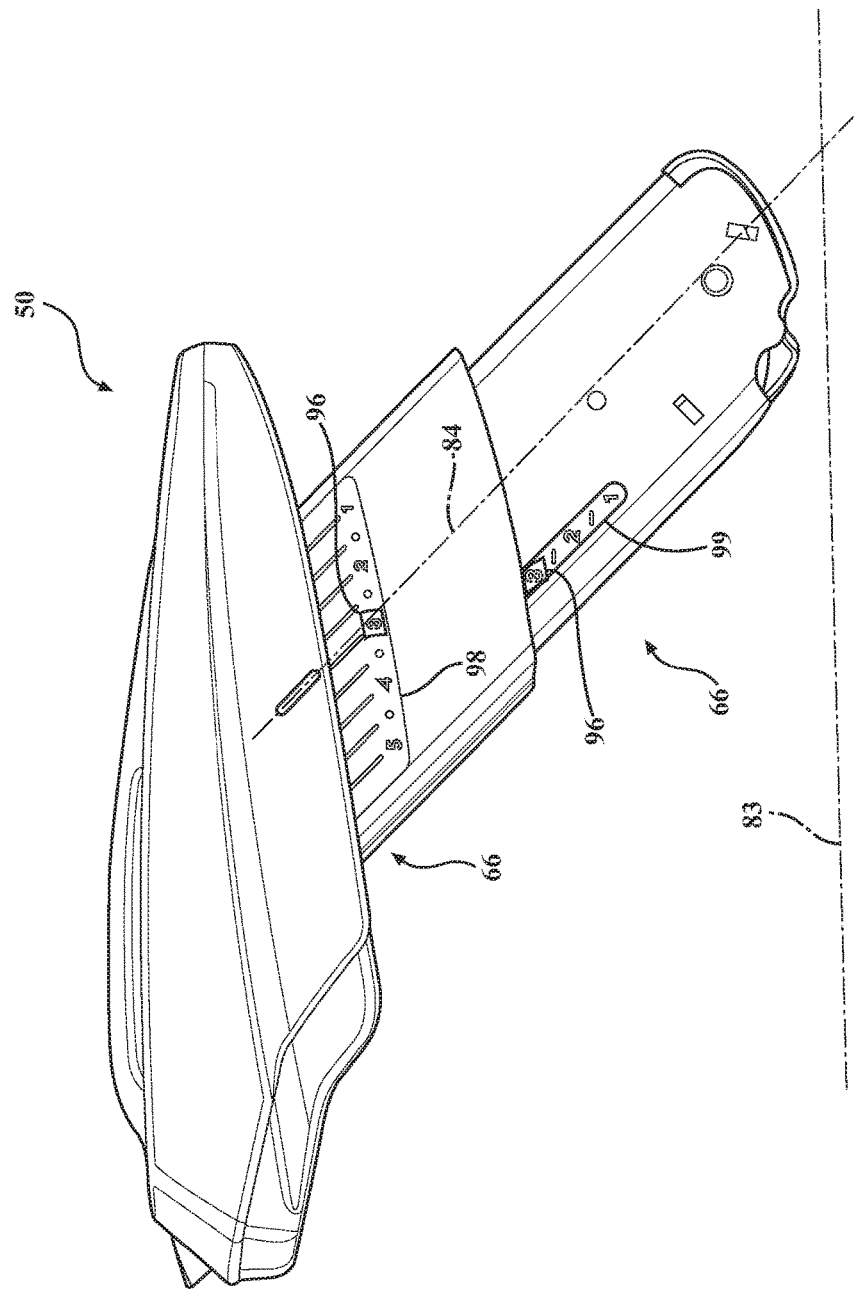
FIG. 11 depicts a right side view of the armrest according to one or more embodiments shown and described herein.

FIG. 11 depicts an embodiment of the armrest 50 comprising one or more position markers 66. A fore/aft position marker 98 and a raised lowered position marker 99 may be used by an operator to identify the current restrained position of the armrest 50 and enable repeatable positioning of the armrest 50 during subsequent uses of the industrial vehicle 10 (FIG. 2) or another industrial vehicle with an armrest 50. Referring to FIG. 5, in one embodiment, the armrest 50 may comprise one or more sight windows 67 to specifically highlight the position of the armrest 50 in relation to the one or more position markers 66. It is further contemplated that the maintenance alignment markings may be bold or boxed 96 or the like to indicate the ideal position of the armrest 50 to access maintenance items below the operator chair 49 (FIG. 2) thereby negating the need for the maintenance alignment markings 95 shown in FIG. 10. It should be understood that the one or more position markers 66 may be located anywhere on the armrest 50 and are not limited to the locations shown in the drawings.

Figure 12:
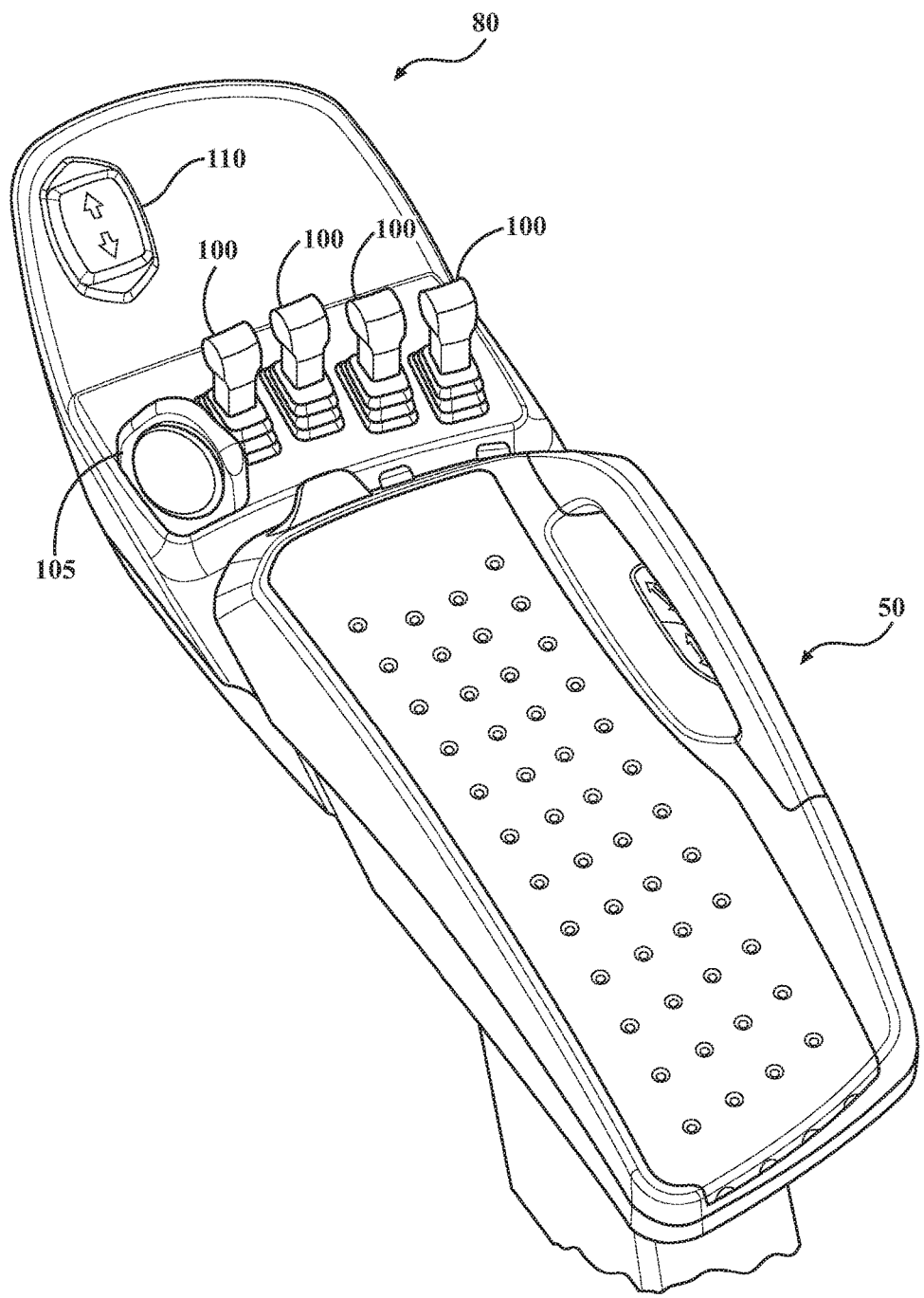
FIG. 12 depicts a perspective view of a control pod according to one or more embodiments shown and described herein.
Figure 13:
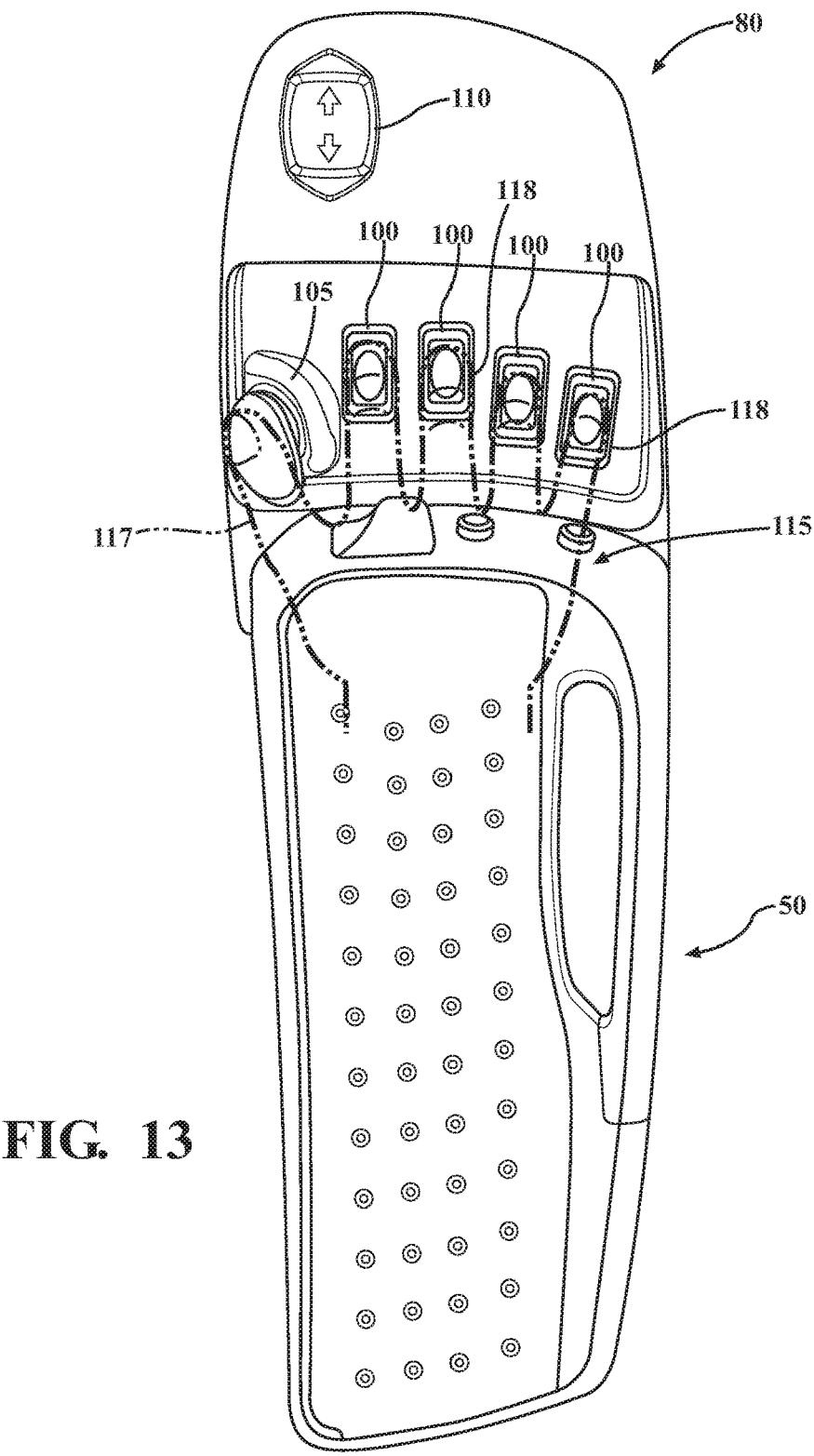
FIG. 13 depicts a top view of the control pod according to one or more embodiments shown and described herein.

FIGS. 12 and 13 illustrate one embodiment of the control pod 80 comprising one or more fingertip control levers 100, a direction control switch 105, and one or more status indicators 110. The fingertip control levers 100 and the direction control switch 105 are positioned to fit a hand 115 (FIG. 13) of a typical operator. Specifically, it is contemplated that a thumb 117 of the hand 115 will rest on the direction control switch 105, and each finger 118 will rest on a fingertip control levers 100. Therefore, the spacing and orientation of each fingertip control lever 100 in relation to each other and the direction control switch 105 is not uniform and serves to mimic the unique hand 115 shape such that the hand 115 does not need to move or rotate and actuation of each fingertip control lever 100 and the direction control switch 105 is done by the fingertips and thumb tip respectively following a "finger-four" design rubric. The one or more status indicators provide indication of vehicle parameters. The one or more fingertip control levers 100, a direction control switch 105, and one or more status indicators 110 are communicatively coupled to the vehicle controller 40 (FIG. 1) and serve as the storage and retrieval hardware control device 23 (FIG. 2).

Figure 14:
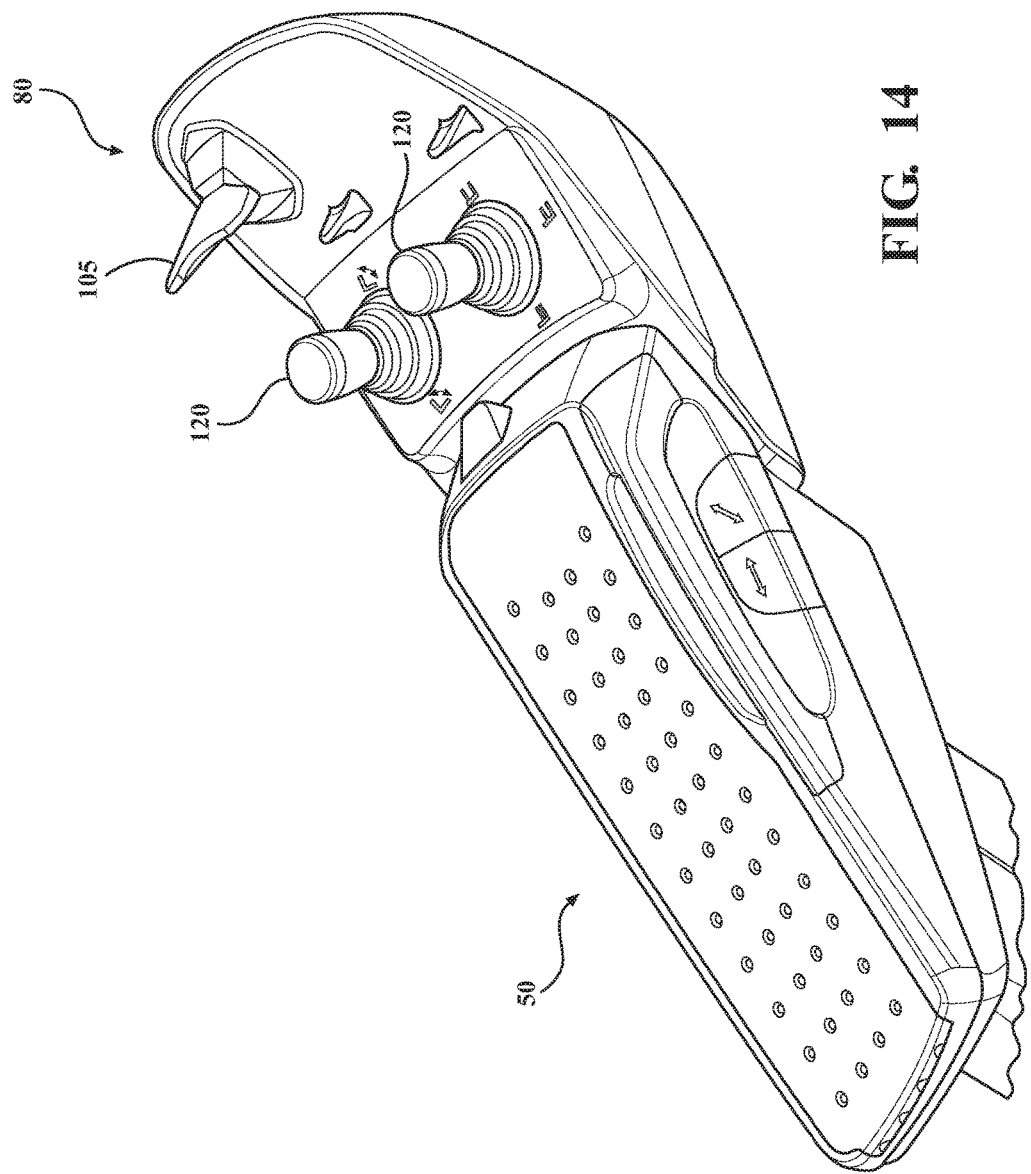
FIG. 14 depicts a perspective view of the control pod according to one or more embodiments shown and described herein.

FIG. 14 illustrates another embodiment of the control pod 80 comprising one or more joysticks 120 and a direction control switch 105. The one or more joysticks 120 and the direction controls switch 105 are communicatively coupled to the vehicle controller 40 (FIG. 1) and serve as the storage and retrieval hardware control device 23 (FIG. 2).

Figure 15:
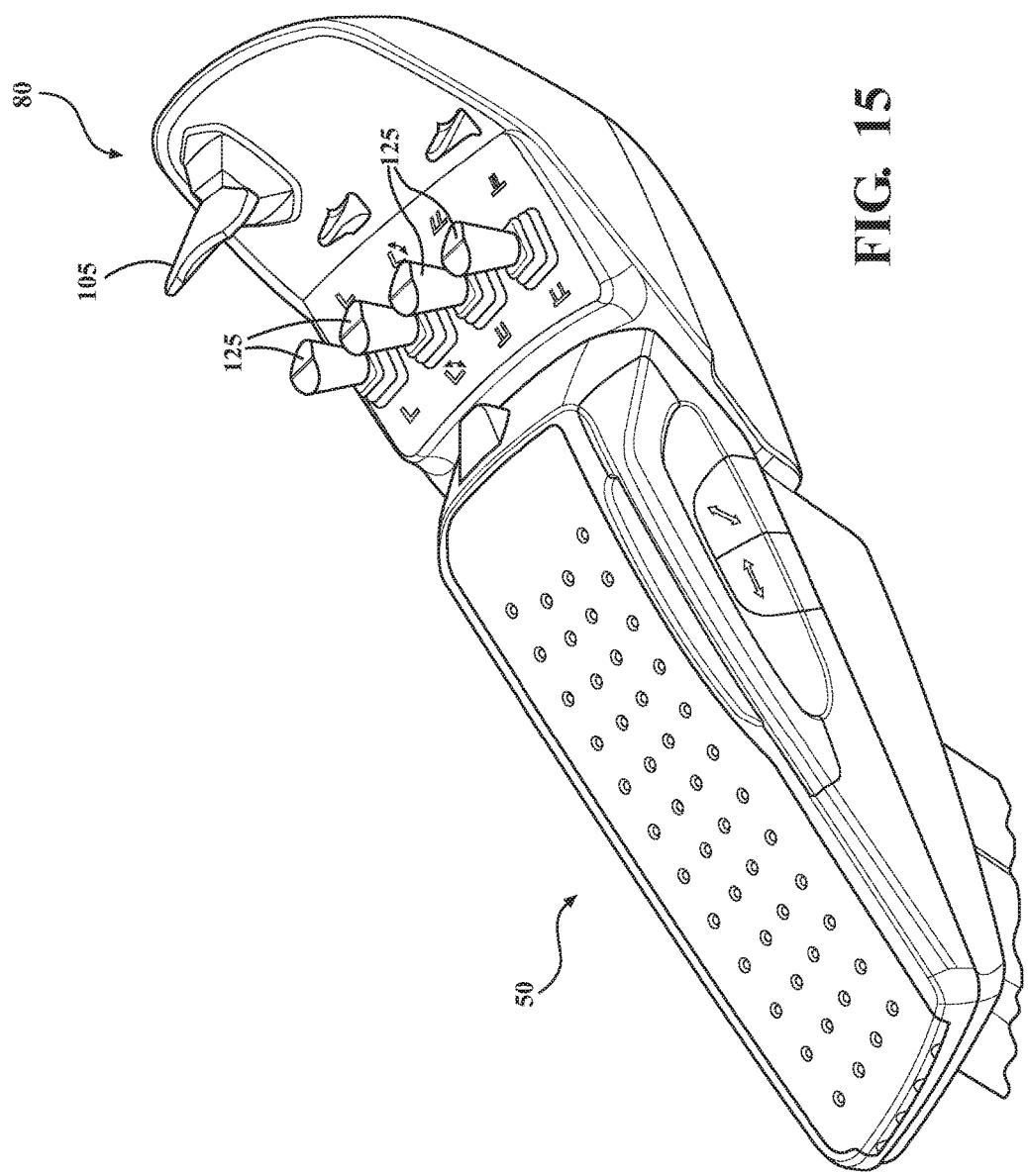
FIG. 15 depicts a perspective view of the control pod according to one or more embodiments shown and described herein.

FIG. 15 illustrates another embodiment of the control pod 80 comprising one or more mini-levers 125 and direction control device 105. The one or more mini-levers 125 and direction control device 105 (both FIGS. 14 and 15) are shown and described in co-pending U.S. Provisional Application No. 62/291,968 filed Feb. 5, 2016 and US Non-Provisional Application with attorney docket number CRN 859 PA and claiming priority to the above noted provisional application, both of which are herein incorporated by reference in their entirety.

The text of this disclosure sets forth a broad description of numerous different embodiments. The description is to be construed as exemplary only and does not describe every possible embodiment since describing every possible embodiment would be impractical, if not impossible, and it will be understood that any feature, characteristic, component, composition, ingredient, product, step, or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference in their entirety.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An armrest comprising:
   an upper support section having one or more ventilation and drainage apertures that couple an upper surface of the upper support section to a lower portion of the armrest to facilitate airflow and drainage between the upper surface of the upper support section and the lower portion of the armrest;
   one or more control implements; and
   an arm pad removably coupled to the upper support section, the arm pad comprising one or more pad apertures formed therein that communicate with the ventilation and drainage apertures to allow ventilation and drainage between an upper surface of the arm pad and the lower portion of the armrest.

2. The armrest of claim 1, wherein the upper support section further comprises one or more drainage channels, the one or more drainage channels being substantially parallel to each other and aligned with the one or more pad apertures to atmospherically couple areas above and below the upper surface of the arm pad.

3. The armrest of claim 2, wherein the upper support section further comprises one or more vent apertures that are atmospherically coupled to one or more of the one or more pad apertures.

4. The armrest of claim 1, wherein the arm pad further comprises:
one or more vent apertures extending between the upper surface and a lower surface of the arm pad; and
one or more drainage channels, each drainage channel positioned about parallel to each other on the lower surface of the arm pad.

5. The armrest of claim 4, wherein each drainage channel is substantially parallel with an armrest axis.

6. The armrest of claim 4, wherein each vent aperture is substantially orthogonal to an armrest axis.

7. The armrest of claim 1, further comprising a handle coupled to the upper support section, wherein the one or more control implements comprise armrest control implements coupled to the upper support section that selectably release or restrain the armrest between ergonomic positions.

8. An armrest comprising:
an upper support section;
one or more control implements; and
an arm pad removably coupled to the upper support section, the arm pad comprising an upper surface with one or more pad apertures formed therein that atmospherically couple areas above and below the upper surface of the arm pad;
wherein at least one of the upper support section or the arm pad comprises one or more drainage channels, the one or more drainage channels being substantially parallel to each other and aligned with the one or more pad apertures to atmospherically couple areas above and below the upper surface of the arm pad.

9. The armrest of claim 8, wherein each drainage channel is substantially parallel with an armrest axis.

10. The armrest of claim 9, wherein each pad aperture is substantially orthogonal to the armrest axis.

11. The armrest of claim 8, wherein the upper support section further comprises one or more vent apertures that are atmospherically coupled to one or more of the one or more pad apertures.

12. The armrest of claim 8, further comprising a handle coupled to the upper support section, wherein the one or more control implements comprise armrest control implements coupled to the upper support section that selectably release or restrain the armrest between ergonomic positions.

13. An industrial vehicle comprising:
an operator chair including an armrest, the armrest comprising:
an upper support section having one or more ventilation and drainage apertures that couple an upper surface of the upper support section to a lower portion of the armrest to facilitate airflow and drainage between the upper surface of the upper support section and the lower portion of the armrest;
one or more control implements; and
an arm pad removably coupled to the upper support section, the arm pad comprising one or more pad apertures formed therein that communicate with the ventilation and drainage apertures to allow ventilation and drainage between an upper surface of the arm pad and the lower portion of the armrest.

14. The industrial vehicle of claim 13, wherein the one or more control implements comprise vehicle control implements in the form of one or more joysticks arranged on or about an orthogonal axis to an armrest axis.

15. The industrial vehicle of claim 13, wherein the one or more control implements comprise vehicle control implements in the form of a plurality of mini-levers arranged on or about a shallow arc centered off the armrest.

16. The industrial vehicle of claim 13, wherein the one or more control implements comprise vehicle control implements in the form of a plurality of fingertip control levers having at least two degrees of freedom to actuate a vehicle function.

17. The industrial vehicle of claim 13, wherein the upper support section further comprises one or more drainage channels, the one or more drainage channels being substantially parallel to each other and aligned with the one or more pad apertures to atmospherically couple areas above and below the upper surface of the arm pad.

18. The industrial vehicle of claim 13, wherein the arm pad further comprises:
one or more vent apertures extending between upper and lower surfaces of the arm pad; and
one or more drainage channels, each drainage channel positioned about parallel to each other on the lower surface of the arm pad.

19. The industrial vehicle of claim 18, wherein each drainage channel is substantially parallel with an armrest axis.

20. The industrial vehicle of claim 19, wherein each vent aperture is substantially orthogonal to the armrest axis.

21. The industrial vehicle of claim 13, wherein the armrest further comprises a handle coupled to the upper support section, wherein the one or more control implements comprise armrest control implements coupled to the upper support section that selectably release or restrain the armrest between ergonomic positions.

* * * * *